March 22, 1932.  J. H. HUNT  1,850,397

DUAL WHEEL MOUNTING

Filed April 7, 1928

INVENTOR.
J. HAROLD HUNT
BY
ATTORNEY.

Patented Mar. 22, 1932

1,850,397

UNITED STATES PATENT OFFICE

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

DUAL WHEEL MOUNTING

Application filed April 7, 1928. Serial No. 268,346.

My invention relates to devices for securing wheels to hubs and particularly wheels of the dual type, such as are centered as well as secured by the securing means.

It has been proposed heretofore to do this combined centering and securing of a pair of wheels relative to the hub by an annular series of studs and a separate series of nuts for each wheel. This arrangement was found very satisfactory in practice, but relatively complex and therefore expensive to manufacture, and requiring extensive manipulation in mounting and demounting the wheels.

It is the main object of my invention to simplify the devices for securing dual wheels of this type, with a consequent reduction in their cost of manufacture, and greater speed in mounting and demounting wheels of this class to and from the hub.

I accomplish this object in the present embodiment of my invention by providing a single axial nut or a single series of securing nuts for both wheels and by arranging a yielding centering means between the two wheels for centering the inner wheel.

Other and further objects and advantages will appear from the following detailed description taken in connection with the drawings in which.

Figure 2:
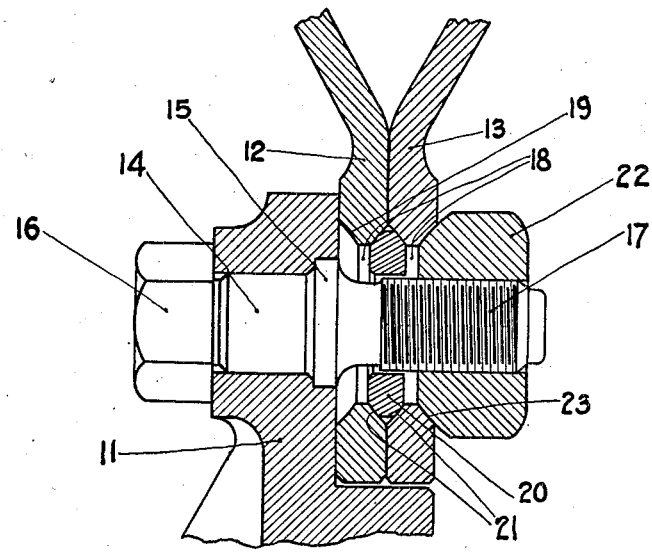
Fig. 2 is a detail sectional view through one of the securing studs.
Figure 3:
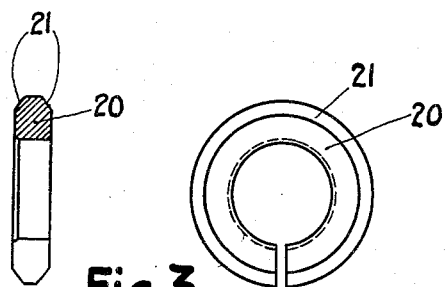
Fig. 3 represents, in detail, three views of the centering washer, being respectively, sectional, plan and elevational views of said washer.
Figure 1:
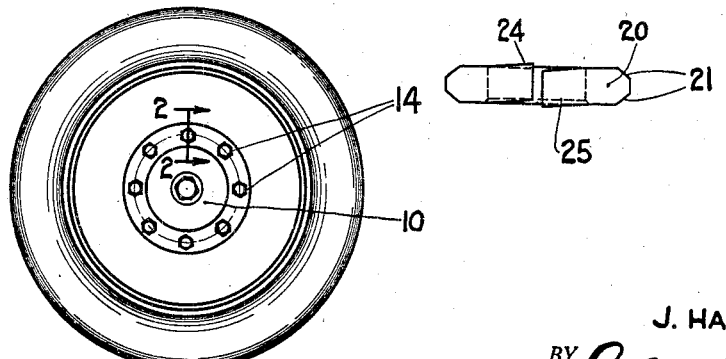
Fig. 1 is a face view of a combined wheel and hub embodying my invention.

The hub body is designated by numeral 10, the radial hub flange, by 11, inner and outer wheel bodies, respectively, by 12 and 13, and the annular series of securing studs by 14.

The securing studs 14 are, as usual, secured to the hub flange 11 by the clamping action of the collars 15 and nuts 16 screwed on the inner screw threaded ends of the studs, the collars being seated in countersinks in the outer face of the hub flange in a usual fashion.

The portions of the studs 17 projecting from the outer face of the hub, are adapted to receive the pair of wheel bodies 12 and 13, in this case interchangeable disc wheel bodies, the inner portions of which extend radially and are secured face to face and the outer portions of which diverge. The holes 18 in the wheel bodies are made considerably larger than the portions of the studs extending through them to permit centering movements of the wheels with respect to the studs under the influence of the centering and securing devices now to be described.

The opposite sides of the holes 18 in the discs are beveled or preferably slightly ball faced as shown at 19. Between the wheel bodies, I arrange on the studs the centering washers 20 having their outer opposite edges 21 formed complementally to the ball face on the opposite sides of the holes in the wheel bodies. The washers 20 are preferably formed to yield somewhat in the direction of their axes under high pressure but such yielding should not ordinarily take place before the convex face 21 of the washers adjacent the corresponding face 19 on the inner disc have seated firmly against said faces and thereby centered the inner disc before the outer disc is, by the final tightening of the nuts 22, having ball faces 23 likewise meeting the ball faces at the opposite sides of the holes in the wheel bodies, forced finally home. By the compression of said washers into contacting relation with the inner disc, the entire ensemble of the two wheels is centered, and secured to the hub in a manner to take substantially all the driving torque and load strains directly through said studs and nuts.

The novel spacing washer may be made, as shown, as a solid split washer with the ends 24 and 25 thereof bent slightly in opposite directions. The resistance to straightening of these ends is sufficient to insure a proper centering of the inner wheel body, before the final tightening pressure is applied by the nuts to force the discs into contact, and compress the outer offset edge of the washers within the recesses formed by the ball faces formed in the adjacent wheel bodies. The washers must always be held to a thickness not greater than the width of these recesses, so that the contacting of the inner faces of the wheels is assured and the drive of the inner disc may be largely taken through the frictional contact between it and the outer disc and the hub flange respectively, and not through the washers and the studs, the washers being primarily for the purpose of centering the inner disc on the hub and not intended to take driving and load strains.

While I have herein described one specific embodiment of my invention it will be understood that changes and modifications may be made without departing from the spirit of the invention, and such changes and modifications I intend to include within the spirit and scope of the appended claims.

What I claim is:—

1. A dual wheel construction comprising a hub, a pair of wheel bodies having their central radially extending portions arranged face to face and in contact with a radially extending surface on the hub, and means for clamping and centering said wheel bodies on the hub and to each other comprising an axially extending threaded member projecting through the wheel bodies, the wheel bodies having holes of larger diameter than said member surrounding the same, and being provided with reentrant annular portions at both ends of said holes, a threaded clamping member screwed to said axially extending threaded member and engaging said reentrant portion at the outside of the outer wheel body to clamp the wheel bodies to the hub and center the outer wheel body, and an axially yieldable annular device arranged between said wheel bodies in the space formed by the adjacent reentrant portions for centering the inner wheel, said device being yieldable to compress it within said space only under the final heavy clamping pressure firmly securing both wheels to the hub and to each other.

2. A dual wheel construction comprising a hub having a radial flange, a pair of wheel bodies having their central radially extending portions arranged face to face and in contact with said radial hub flange, and an annular series of securing devices for clamping and centering said wheel bodies to the hub and in engagement with each other, and comprising an annular series of studs mounted on said hub flange and an annular series of nuts cooperating with said studs, said wheel bodies having holes loosely fitting over said studs and provided with annular reentrant sockets at the opposite ends of said holes, said nuts being provided with corresponding annular projections adapted to seat in the outer sockets of the outer wheel body to center said wheel body and clamp both wheel bodies against the hub flange, and annular devices adapted to yield axially under heavy pressures loosely fitting over said studs and arranged between the wheel bodies and having annular formations complemental to the sockets in the wheel bodies and adapted to enter said sockets to center the inner disc and be compressed under final heavy clamping pressures, securing the wheel bodies, in the recesses formed by adjacent wheel sockets.

In testimony whereof he hereunto affixes his signature.

J. HAROLD HUNT.